May 3, 1932.  W. L. MARDEN  1,856,850
FLUID METERING DEVICE
Filed Dec. 31, 1930   2 Sheets-Sheet 1

Inventor
William L. Marden
By his Attorneys

May 3, 1932. W. L. MARDEN 1,856,850
FLUID METERING DEVICE
Filed Dec. 31, 1930 2 Sheets-Sheet 2

Inventor
William L. Marden
By his Attorneys

Patented May 3, 1932

1,856,850

UNITED STATES PATENT OFFICE

WILLIAM L. MARDEN, OF ELMHURST, NEW YORK, ASSIGNOR TO NEPTUNE METER COMPANY, OF NEW YORK, N. Y., A CORPORATION OF NEW JERSEY

FLUID METERING DEVICE

Application filed December 31, 1930. Serial No. 505,778.

The present invention relates to fluid metering devices and embodies, more specifically, an improved mechanism, wherein the continuous flow of a fluid through the meter actuates a cylinder which is oscillatably mounted within a cylindrical chamber. More particularly, the invention embodies an improved construction for meters of this character wherein the oscillating cylinder is readily and accurately manufactured, the machining and fitting surfaces being reduced to a minimum.

In mechanisms of this character, a suitable power take-off is provided to utilize the oscillating motion of the cylinder within the cylindrical chamber to drive a suitable registering mechanism, the volume of fluid passed by the mechanism for each revolution within the chamber thus being accurately determined. It has been found, in meters of this type as distinguished from meters utilizing a wobble plate, that the accuracy with which the surfaces must be machined and fitted has prevented the extensive use of this type of meter in spite of the fact that it frequently is highly desirable to utilize the same.

An object of the invention, accordingly, is to provide a continuous flow meter having an oscillatable cylinder which is subjected to the pressure of the fluid and caused to oscillate thereby, the construction of the cylinder and chamber being such as to facilitate the manufacture and assembly of the elements.

A further object of the invention is to provide a meter of the above character, wherein the number and extent of surfaces to be accurately fitted is reduced to a minimum, the elements being so constructed as to greatly facilitate the manufacture thereof.

A further object of the invention is to provide a meter of the above character, wherein the parts are so constructed as to readily telescope within each other into assembled position, at the same time providing an effective mechanism for introducing and discharging the fluid from the metering chamber.

Further objects, not specifically enumerated above, will be apparent as the invention is described in greater detail in connection with the accompanying drawings, wherein.

Figure 1:
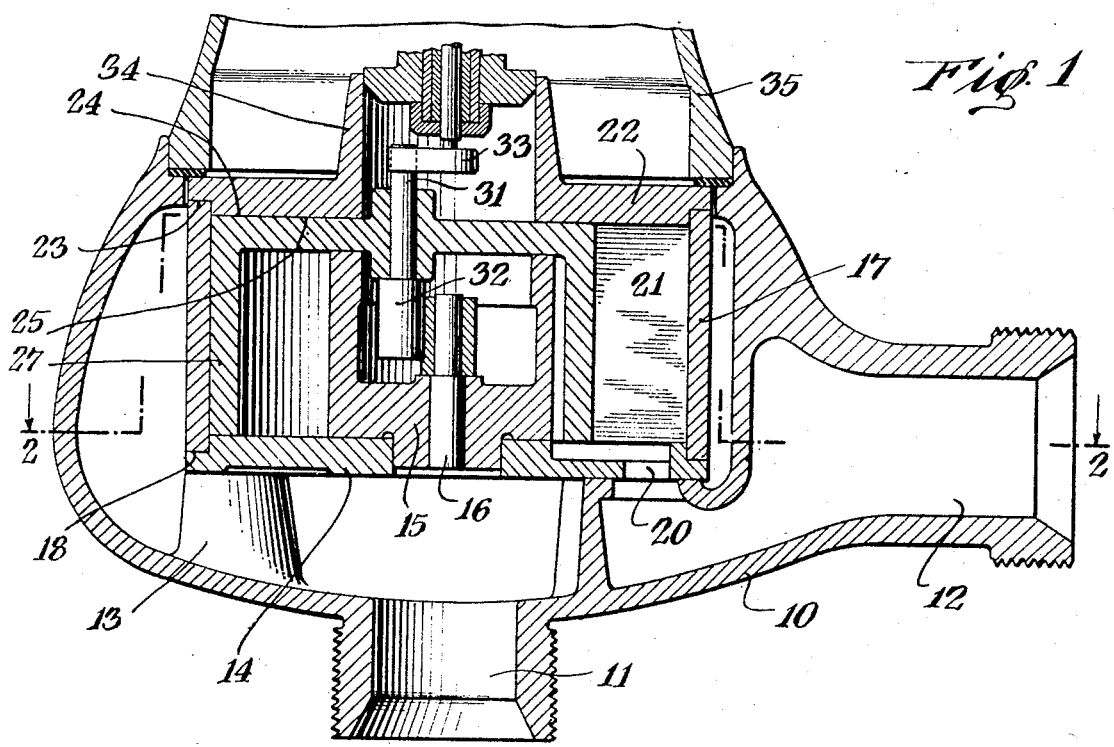
Figure 1 is a view in section, taken in a plane passing through the axis of the meter and showing the metering chamber, as well as the oscillating cylinder and the power take-off therefor.

Referring to the above drawings, a meter is shown at 10, formed with an inlet 11 and an outlet 12. A platform 13 is formed within the meter to receive a bottom cylinder head 14, provided with a cup-shaped fitting 15 having a vertically extending pin 16 within the cup. A cylindrical wall 17 is adapted to fit within peripheral groove 18 in the bottom cylinder head 14 and the bottom cylinder head is formed with an inlet aperature 19 which communicates with the inlet 11 and an outlet aperture 20 which communicates with the outlet 12. The cylinder wall 17 further carries a partition 21 spaced between the apertures 19 and 20, this wall extending between the bottom cylinder head 14 and a top cylinder head 22. The top cylinder head 22 is provided with a peripheral groove 23 similar to groove 18, which receives the cylindrical housing member and is provided with a lower bearing face 24 against which the upper bearing face 25 of a measuring chamber piston 26 engages.

The measuring chamber piston consists of a hollow cylindrical portion 27 which is closed at one end and formed about an axis upon a radius shorter than that of the cylindrical wall 17. In its movement, the outer peripheral surface of the cylindrical portion 27 rolls upon the inner perpiheral surface of the cylindrical wall 17 and the axis of the piston thus oscillates due to such rolling motion as constrained by the engagement of the partition 21 with a slot 28, formed in the piston. The slot is preferably formed with outwardly tapered sides 29 to permit the oscillatory movement about the partition 21. The top of the piston is formed with a cutaway portion 30 which also accommodates the oscillatory movement about the partition 21.

A pin 31 is secured in the piston 26 axially thereof and is provided with a roller 32 which engages the stub shaft 16 and likewise engages a power take-off mechanism 33, received in an upwardly extending cylindrical flange 34 which is formed upon the top cylinder head.

Figure 2:
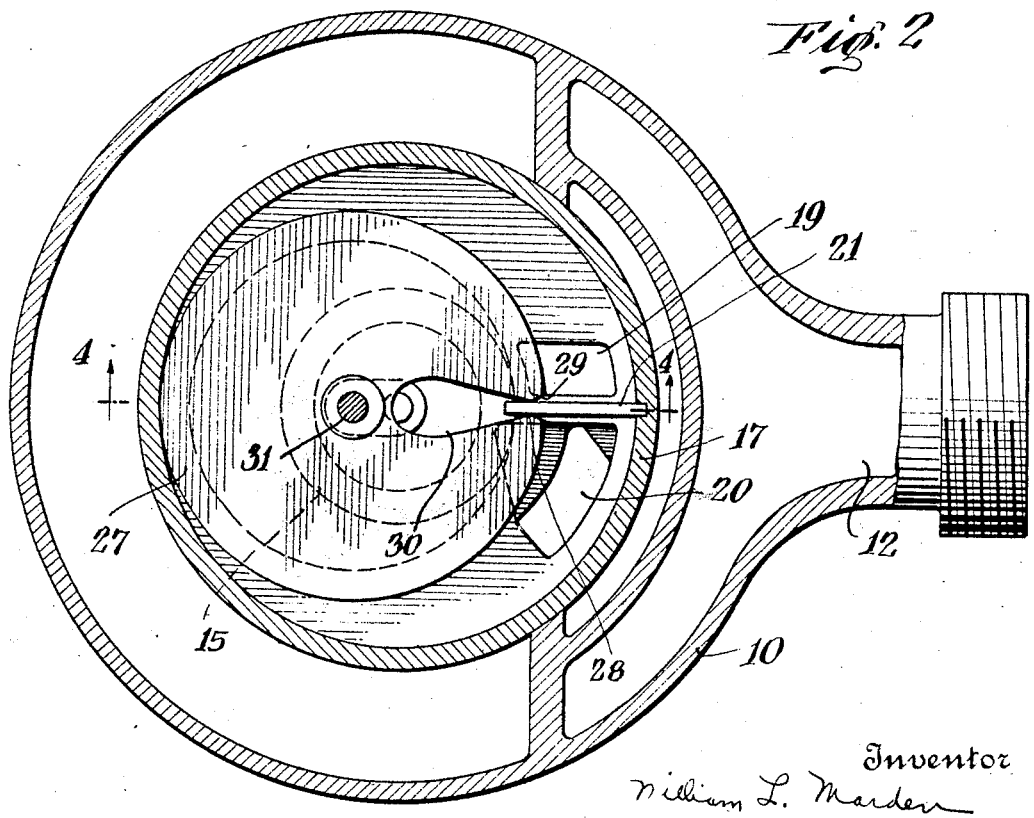
Figure 2 is a view in section, taken on line 2—2 of Figure 1, and looking in the direction of the arrows.
Figure 3:
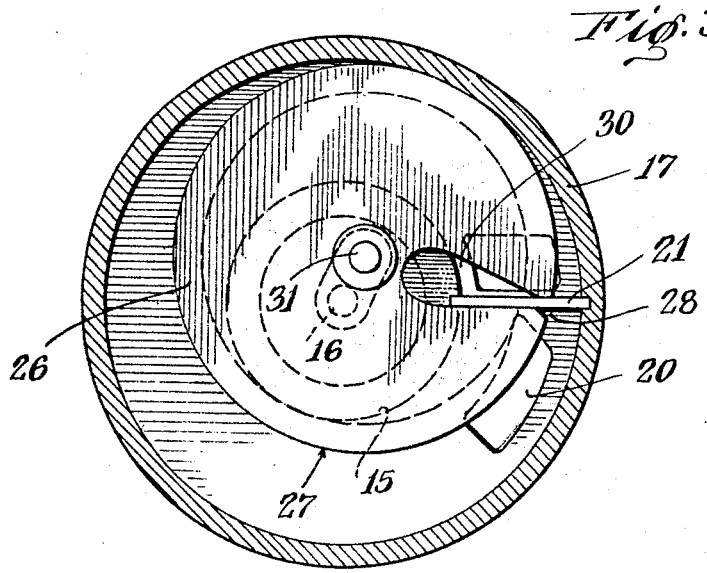
Figure 3 is a plan view of the chamber and cylinder in the position wherein fluid is about to be received within the chamber to actuate the cylinder at the initial point of its cycle of operation.
Figure 4:
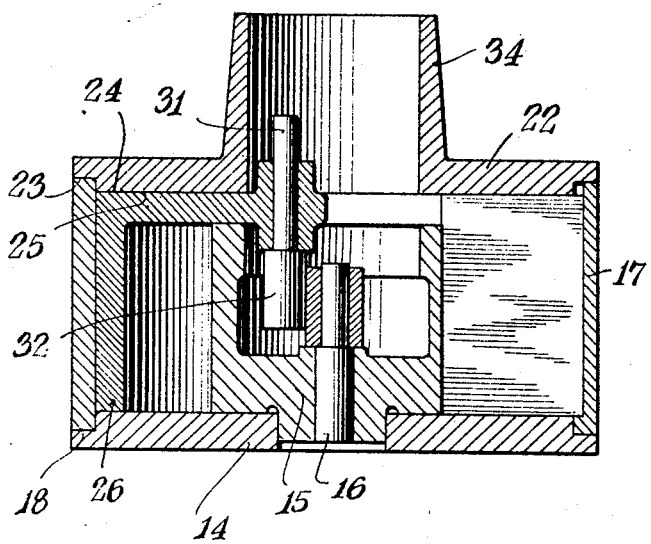
Figure 4 is a view in section, taken on line 4—4 of Figure 2, and looking in the direction of the arrows.
Figure 5:
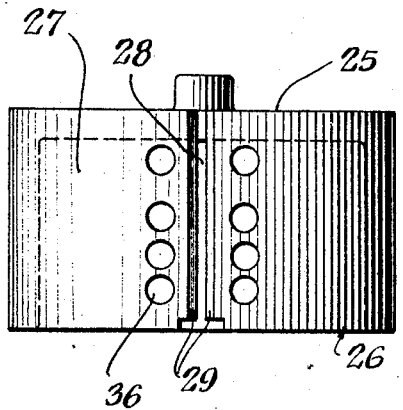
Figure 5 is a view in elevation, showing the measuring chamber piston of a meter constructed in accordance with the present invention.

The top of the meter housing 35 is secured in position over the mechanism described above and the mechanism functions in a manner which will be readily apparent from an inspection of Figures 2 and 3, the cycle of operation of the piston being illustrated therein. A plurality of apertures 36 are formed in the piston and serve to break any vacuum which might be created during the operation thereof. In constructing the above elements, it will be seen that only a comparatively few machining operations are required to provide an accurate fit between the bearing surfaces of the meter. A minimum number of bearing surfaces are provided which serve to effectively seal the fluid compartments from the compartments in which it is desired that no fluid exist and the mechanism is thus readily manufactured and assembled.

While the invention has been described with specific reference to the accompanying drawings, it is not to be limited, save as defined in the appended claim.

I claim as my invention:

In a metering device, a cylindrical chamber, a lower cylinder head having an axial aperture, a cup-shaped extension in the chamber formed with a boss adapted to engage the aperture, an upper cylindrical head having a lower plane bearing surface, a hollow cylindrical piston closed at one end and mounted between the heads and bearing against the plane bearing surface and the extension, a guide pin carried in the extension coaxial with the chamber, an axial pin on the piston engaging the first pin, and fluid connections communicating with the chamber.

This specification signed this 27th day of December, A. D. 1930.

WILLIAM L. MARDEN.